(12) United States Patent
Röhrig

(10) Patent No.: US 6,575,999 B1
(45) Date of Patent: Jun. 10, 2003

(54) NIPPLE PACIFIER

(75) Inventor: Peter Röhrig, Vienna (AT)

(73) Assignee: Bamed AG, Altendorf (CH)

( * ) Notice: Subject to any disclaimer, the term of this patent is extended or adjusted under 35 U.S.C. 154(b) by 0 days.

(21) Appl. No.: 09/646,164

(22) PCT Filed: Feb. 4, 1999

(86) PCT No.: PCT/AT99/00029

§ 371 (c)(1),
(2), (4) Date: Sep. 14, 2000

(87) PCT Pub. No.: WO99/47100

PCT Pub. Date: Sep. 23, 1999

(30) Foreign Application Priority Data

Mar. 18, 1998 (AU) .............................. A 477/98

(51) Int. Cl.[7] ................................................ A61J 17/00
(52) U.S. Cl. ...................................................... 606/234
(58) Field of Search ................... 606/234–236; 446/73, 75; D24/195

(56) References Cited

U.S. PATENT DOCUMENTS

| | | | | |
|---|---|---|---|---|
| 2,612,165 A | | 9/1952 | Szuderski | |
| 4,329,996 A | * | 5/1982 | Copeland | 606/234 |
| 5,127,903 A | | 7/1992 | Mailot | |
| 5,700,279 A | | 12/1997 | Blando | |
| 6,066,162 A | * | 5/2000 | Hudson | 606/234 |
| 6,139,566 A | * | 10/2000 | Bennett | 606/236 |

FOREIGN PATENT DOCUMENTS

| | | |
|---|---|---|
| FI | U2850 | 4/1997 |
| FR | 698047 | 1/1931 |
| WO | 9827928 | 7/1998 |

* cited by examiner

Primary Examiner—Michael J. Milano
Assistant Examiner—(Jackie) Tan-Uyen T. Ho
(74) Attorney, Agent, or Firm—Ladas & Parry

(57) ABSTRACT

A pacifier nipple with a subdivided, elastomeric nipple body (1) comprising a fastening portion (2), a neck portion (3) and a head portion (4) and in which a receiving space (6) for substances, e.g. a medicament for oral administration, is provided; this receiving space (6) is provided in the head portion (4) that is separated from the neck portion (3), and the head portion (4) is formed by a reversible hood (7) provided with a sealing lip (9') abutting on the remaining nipple body (2, 3) and liftable therefrom.

15 Claims, 3 Drawing Sheets

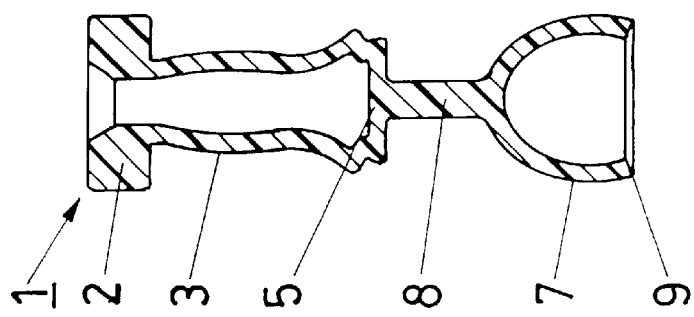
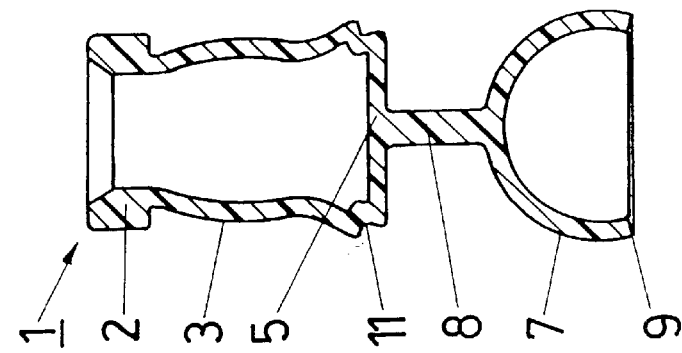
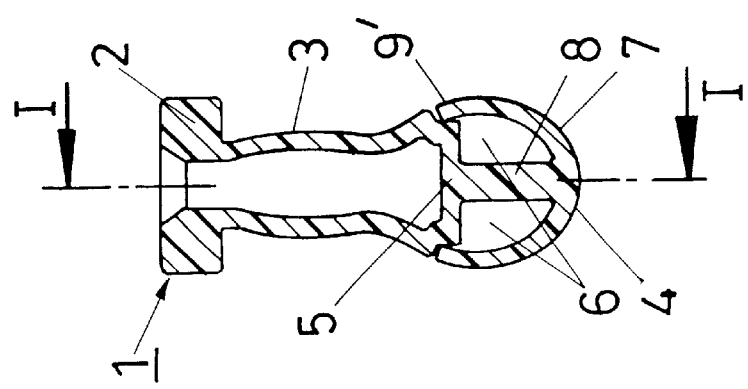
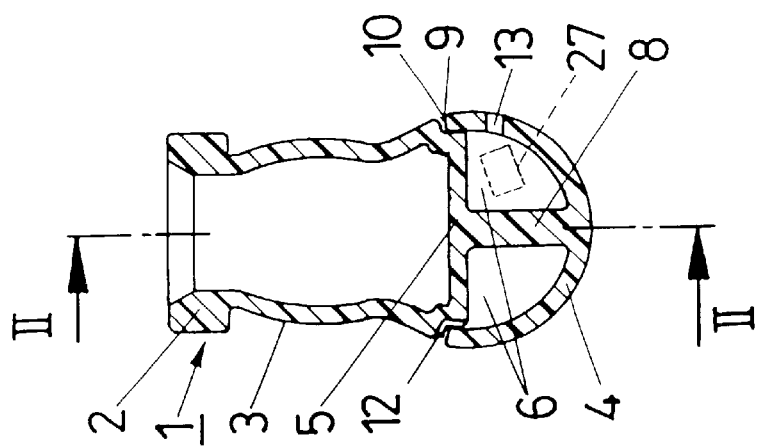

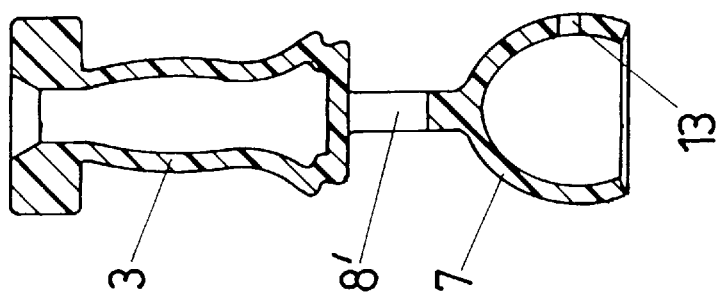
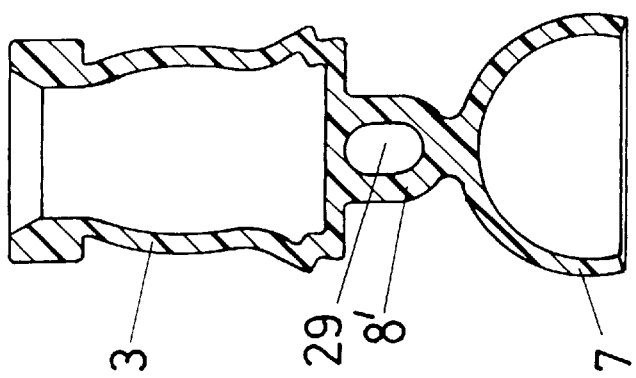
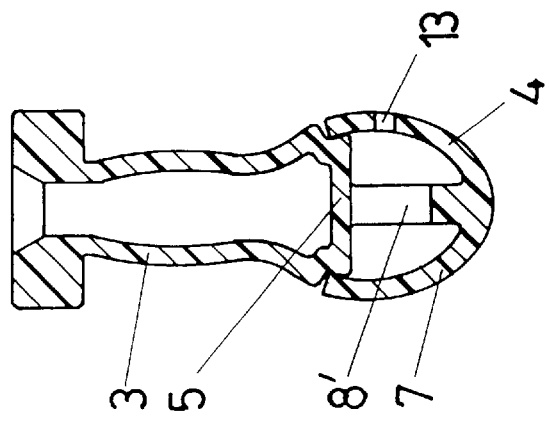
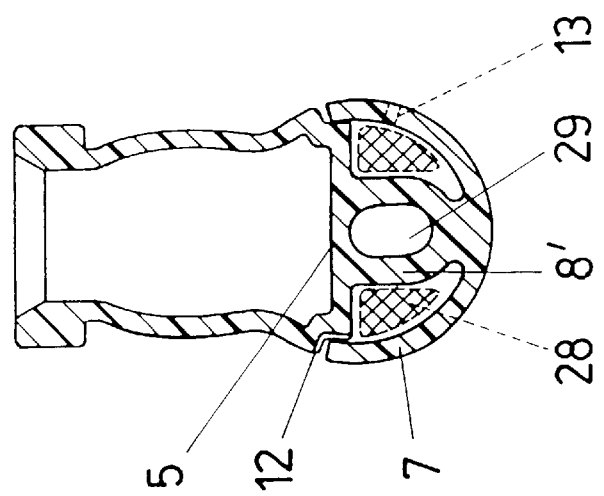

NIPPLE PACIFIER

The invention relates to a pacifier nipple comprising a subdivided elastomeric nipple body including a fastening portion, a neck portion and a head portion wherein a receiving space for substances, e.g. a medicament for oral administration, is provided.

The oral administration of medicaments or similar substances to infants often is difficult since the children refuse to take these substances because of their unpleasant taste. Moreover, as a rule tablets cannot be administered to infants because of the risk of suffocation, and in some instances it may be necessary for the active ingredient of the medicament to be released gradually, with the infants, however, being unable to suck tablets or to chew them.

In DE 3,503,777 A, a medicament dispensing nipple has been proposed in which the interior of the entire nipple body forms a receiving space for a medicament; the nipple body is perforated over approximately half its longitudinal extension, and at its rear side it communicates with a refilling channel via which the respective medicament can be introduced into the nipple body. The refilling channel has an associated detachable closing cap. Nipples of similar principle have, furthermore, been proposed in U.S. Pat. No. 5,078,734 A as well as in WO 91/04 727 A.

One disadvantage is that depending on the position of the head of the child who uses the pacifier provided with the medicament dispensing nipple, the medicament may also remain in the rear or outer region of the nipple body and thus outside the mouth. Accordingly, an embodiment has already been proposed in WO 91/04 727 A in which the medicament is lodged between two layers of the nipple body in the front or head portion thereof. However, this is a nipple which can be used only once, whereas it is sought to be able to use a pacifier comprising a dispenser nipple over a longer period of time, also for a more frequent medicament delivery.

The disadvantage of the incomplete administration of the respective medicament during sucking on the pacifier also applies to the pacifier according to CH 684 160 A. The interior of the nipple body of this pacifier is subdivided by a separating wall, with the respective medicament being received in the interior of the neck portion of the nipple body which is separated from the head or palate portion by the separating wall. To deliver the medicament, numerous small perforations are provided in this neck portion.

Yet above all also here it is a disadvantage—just with all the other known nipples with the possibility of administering a medicament—that the respective medicament is re-filled from the rear or outer side via the fastening portion of the nipple body in the region of the pacifier shield, if the pacifier is used several times as a medicament dispenser, and this requires attaching removable closing parts, such as plugs or the like. Accordingly, this results in releasable pacifier parts, and the pacifier embodiments altogether are not disassembly-proof, resulting in a substantial risk that the infant will swallow parts of the pacifier after an accidental disassembly or detachment of parts thereof.

Also cleaning of the known nipple bodies in their interior after a medicament has been administered is only possible with the greatest difficulties, and the production of the nipple body of the pacifier according to CH 684 160 A with the closed head or palate portion is also difficult.

As has already been implied before, it has been a wish for some time to design comforters or pacifiers as disassembly-proof and orthodontologically suitable as possible. In this connection mention may be made, e.g., of AT 338 440 B.

The invention thus has as its object to provide a nipple of the above defined type, in which the medicament to be administered need not be introduced from the rear side of the exterior of the pacifier, through the attachment portion of the nipple body, so that this nipple is suitable for use in a disassembly-proof pacifier, such as the one according to the afore-mentioned AT 338 440 B; moreover, the nipple is to be easy to produce and also easy to clean, and filling with a medicament nevertheless shall not pose any problems.

The pacifier nipple according to the invention of the initially defined type is characterized in that the receiving space is provided in the head portion that is separated from the neck portion and that the head portion is provided with a sealing lip abutting on the remaining nipple body and liftable therefrom.

In the pacifier nipple according to the invention thus the respective medicament to be administered or, generally, the substance is received in the front head portion of the nipple body, and thus it is ensured that the child will take in this substance gradually during sucking when using the pacifier. For filling the receiving space in the head portion, the sealing lip thereof may be lifted off the remaining nipple body to the appropriate extent. The administration of the substance to the infant may also be effected by a—slighter—lifting of the sealing lip, the extent of lifting being controllable by the intensity of sucking. The present nipple is easy and well to be cleaned if the sealing lip is lifted off the remaining nipple body or is reversed.

Other than the nipple pacifiers according to the prior art, this nipple configuration is also suitable for collecting the saliva of the infant, e.g. for medical tests, in an advantageous manner, since during sucking, by lifting the sealing lip at the "valve seat" formed by the remaining nipple body, saliva may get past the "valve seat" into the interior of the head portion, i.e. into its receiving space, in sufficient amounts. There, it is also advantageous to provide a foam material body in the receiving space which takes up the saliva like a sponge. This foam material body may, e.g., have the shape of a slit ring.

An embodiment has proven particular advantageous in which the head portion comprises a hood connected with the remaining nipple body and adjoining the remaining nipple body at least over part of its periphery via a separating line, the hood being outwardly reversible. The nipple may be produced in a state in which the hood is outwardly reversed so that in that state there are no overlapping parts, which simplifies the production in one piece. The preferred integral configuration of the nipple body not only has the advantage of a simple production, but moreover, also that of being more resistant against an undesired separation which, e.g., might happen if the nipple body is produced in parts which are connected later on, such as by gluing.

Accordingly, it is to be particularly preferred if the hood is integrally connected with the remaining nipple body.

Although it would be possible to connect the hood in one piece with the remaining nipple body via a more or less strip-shaped outer web that forms part of the nipple body jacket, it is particularly suitable with a view to the attainable higher strength as well as, finally, also the simpler mould design and production if, via an axial, central shaft part, the hood is connected with a front-end wall that closes the neck portion. With such a configuration, the hood with its entire free rim which normally faces the remaining nipple body, can be reversed in the direction away from the fastening and neck portions of the nipple body, so that then a reversed "cup" is present which is connected in one piece with the remaining nipple body via a central "stem", the shaft part. There, it is furthermore advantageous if the shaft part has at least one opening for the clamping retention of medicaments in the form of tablets or capsules.

The remaining nipple body suitably has a step- or shoulder-shaped abutment surface as "valve seat" at the periphery of the separating wall where the free rim of the hood rests in its normal position. However, to facilitate the delivery of the medicament received in the receiving space, i.e. in the interior of the hood, a passage of appropriately small cross-section may be provided in this abutment or sealing region so as not to cause an undesired, excessive seeping out of the medicament before the pacifier provided with the nipple is used. Accordingly, an advantageous embodiment is characterized in that at least one channel-shaped passage is provided on the rim of the hood adjacent the remaining nipple body and the hood otherwise rests on the remaining nipple body with its rim acting as a sealing lip.

Yet, it is, of course, also possible that at least one passage opening is provided in the hood in a manner known per se for delivery of the medicament.

As known per se, the nipple body may be made of the most varying rubber materials, yet preferably it is made of silicone caoutchouc.

The invention also has as its object an advantageous method of producing a nipple according to the invention, wherein the nipple body is moulded of an injection-mouldable mass, in particular silicone caoutchouc, and this method according to the invention is characterized in that the nipple body is moulded in its state with outwardly reversed hood and that the hood is turned back into its normal position after the nipple body has been removed from the mould. In this manner, as has already been implied before, despite the relatively complicated form of the nipple body in its normal state with the super-imposed regions, a simple production in one step is possible without any problems. In doing so, it may also be provided that during the moulding of the nipple body with its outwardly reversed hood, simultaneously at least one passage opening is formed by aid of at least one spike insert. Moreover, it is suitable if during moulding of the nipple body, simultaneously at least one opening is shaped in the shaft part by aid of at least one spike insert.

Finally, the invention also relates to a device for producing the present nipple according to the method of the invention, with a mould corresponding to the nipple body, wherein, according to the invention, the mould has an associated core for forming the outward-reversed hood. There, moreover, it is advantageous if a further core located opposite the core for the formation of the reversed hood is provided for forming the hollow fastening and neck portions of the nipple body. This further core may, however, be done without if a solid, i.e. full mass configuration of the fastening and neck portion nipple body were desired.

To simultaneously perforate the hood for the passage of the medicament in one operation it is, finally, suitable if the mould has recesses for inserts for the moulding of the passage opening(s) in the hood and/or the opening(s) in the shaft part.

In the following, the invention will be explained by way of several preferred exemplary embodiments illustrated in the drawings to which, however, it shall not be restricted.

FIG. 1 shows an axial section through a nipple body according to line I—I of FIG. 2;

FIG. 2 shows a corresponding axial section through this nipple body according to line II—II of FIG. 1;

FIGS. 3 and 4 show corresponding sectional representations of this nipple body, wherein FIGS. 3 and 4, however, show the hood defining the head portion of the nipple body in its outwardly reversed state;

Figure 5:
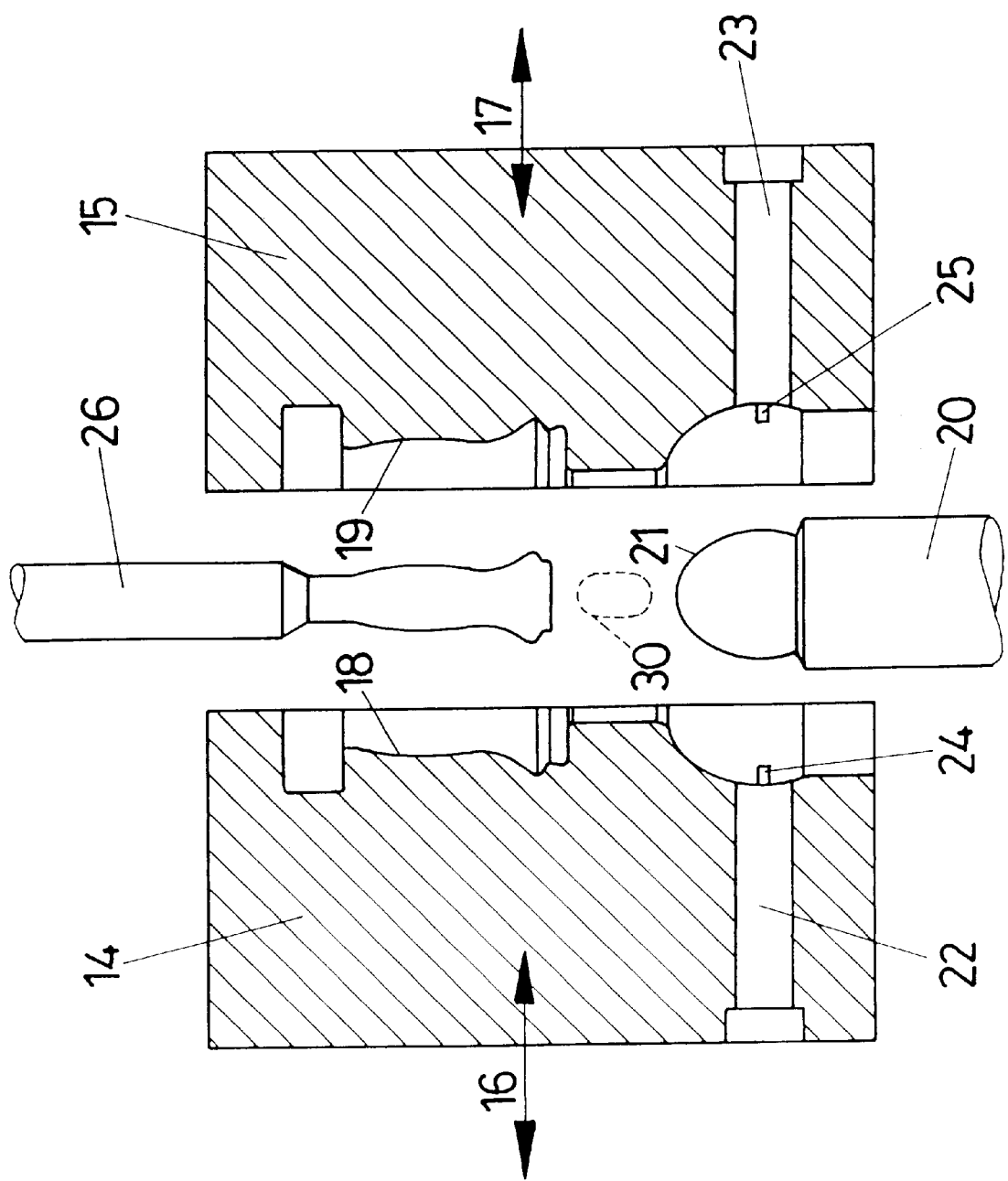

FIG. 5 schematically shows a two-part form having two associated cores for producing such a nipple body in the configuration with outwardly reversed hood according to FIGS. 3 and 4; and FIGS. 6 to 9 show longitudinal sectional representations, corresponding to the illustrations according to FIGS. 1 to 4, of a modified nipple body in its state of use (FIGS. 6, 7) and in its state at removal from the mould (FIGS. 8, 9).

In FIGS. 1 to 4, a presently particularly preferred pacifier nipple body designated by 1 in its entirety is shown which is suitable for the disassembly-proof attachment in a pacifier, e.g. according to AT 338 440 B, or also AT 379 508 B. Since the thus disassembly-proof pacifiers as such are well known, a description thereof is not necessary and an explanation of the nipple body 1 will be sufficient.

The present nipple body 1 has a bead-like rear attachment portion 2 by which, when mounted, it will be held in a manner known per se at the rear side of a pacifier shield not illustrated here; furthermore, it has a neck portion 3 as well as a head portion (a palate portion) 4 of cross-sectional dimensions larger than that of the neck portion 3.

At its forward front end, the neck portion 3 is closed by a front-end wall 5 which at the same time rearwardly delimits a receiving space 6 in the interior of the head portion 4. Towards the front side, the head portion 4 is formed by a hood 7 connected, via a central shaft part 8, with the front-end wall 5 and, thus, with the remaining nipple body 2, 3. In the region of a rim 9 or of a separating line 10, respectively, this hood 7 rests on the remaining nipple body 2, 3 so as to form a more or less tight seal, the curvature of the hood 7 also possibly providing a bias and thus a certain abutment or sealing pressure. Around the front-end wall 5 of the neck portion 3, a valve-seat-like step or shoulder region 11 is shaped in which optionally, as is apparent from FIG. 1, locally at least a small passage channel 12 may be formed. Such a channel-shaped passage 12 could, of course, also be provided by moulding locally a depression of an appropriately small cross-section on the rim 9 of the hood 7.

Thereinstead or in addition thereto, the hood 7 may have at least one passage opening in the manner of a perforation, as is indicated at 13 in FIG. 1.

It would, however, also be conceivable to omit such passage openings 13 or channel-shaped passages 12, since a leakage of a substance contained in the receiving space 6, e.g. a liquid or powderized medicament, will also be obtained by the rim 9 of the hood 7, which forms a sealing lip 9' over the entire periphery, slightly lifting from its valve seat, i.e. from the shoulder region 11.

That such lifting off as far as to turning inside out of the hood 7, against the elastic resistance of the material of the hood 7, is possible may be seen from the illustrations in FIGS. 3 and 4 in which the nipple body 1 is illustrated in a configuration in which the hood 7 has been "outwardly" reversed, i.e. away from the remaining nipple body. The hood 7 may have a somewhat modified shape as compared to the normal configuration according to FIGS. 1 and 2, i.e. with a narrower rim 9, so that in its normal state according to FIGS. 1 and 2, the hood 7 will abut on the "valve seat" 11 with bias, as mentioned before. By this as well as by the curvature of the hood 7, also a certain dimensional stability of the head portion 4 of the nipple 1 is ensured.

In the configuration according to FIGS. 3 and 4, with the hood 7 reversed, as can directly be seen, it is possible to produce the nipple body 1 in one mould without any problems, since then, different from the normal configurations according to FIGS. 1 and 2, there are no longer any overlapping parts.

In FIG. 5, a corresponding, e.g. two-part, mould comprising mould jaws 14, 15 is shown, wherein the mould jaws 14, 15 can be closed or opened, respectively, according to the double arrows 16, 17. The mould jaws 14, 15 define a mould cavity 18, 19 into which, in the closed state of a mould, a front core 20 with a head 21 corresponding to the interior of the hood 7 (FIGS. 3, 4) will extend. In the region of this head 21 or of the reversed hood 7 to be formed, e.g. pin-like inserts 22, 23 having front spikes 24, 25 for forming the passage openings 13 (cf. FIG. 1) are inserted in the mould jaws 14, 15 in corresponding bores or the like recesses. A further core 26 serves to form the hollow neck portion 3 and the attachment portion 2 at the inner side.

Thus, the nipple body 1 described preferably is formed in one piece from an elastomer, in particular of silicone caoutchouc or a thermoplastic elastomer, the hood 7 being turned back into its normal configuration according to FIGS. 1 and 2 after the moulding proper.

When the entire pacifier has been assembled, if required, a substance, such as a medicament, may be filled into the receiving space 6 within the hood 7 by lifting the hood 7 with its rim 9 at least partially off the remaining nipple body 2, 3. The substance may, e.g., be liquid or powderized, it may, however, also be present in the form of a tablet or capsule (e.g. with retarded delivery of the active agent), as is schematically shown at 27 in FIG. 1.

On the other hand, the nipple 1 described may also be used to collect saliva from the child using the pacifier, in the receptable 6 within the hood 7, to be used for various tests. It is also conceivable to apply a foam rubber body in the receiving space 6 in the interior of the head portion 4 so as to absorb the saliva.

Such a foam rubber body 28 in the form of a slit ring which is inserted around the shaft part is schematically shown in FIG. 6 in broken lines. FIG. 6 shows in combination with FIGS. 7 to 9 a modified embodiment of the nipple 1, as compared with the nipple according to FIGS. 1 to 4, this modification consisting in the provision of a shaft part 8' having an opening 29. This opening 29 which leads to a widening of the shaft part 8' such that the shaft part 8' will be relatively flat to wall-shaped, serves to clampingly retain solid medicaments, i.e. tablets or capsules.

Otherwise, the nipple according to FIGS. 6 to 9 corresponds to that of FIGS. 1 to 4, primarily as regards the neck portion 3 and the head portion 4 with the hood 7 as well as the channel-shaped passage 12 and the passage opening 13 so that it is not necessary to describe them again. In particular, also the production of this modified nipple body is effected in the same manner as explained before by way of FIGS. 1 to 4 and, in particular, FIG. 5, i.e. with outwardly reversed hood 7, cf. FIGS. 8 and 9. To make the opening 29 in the shaft part 8', a spike insert comparable to the spike inserts 22, 23 according to FIG. 5 (which there serve to provide the passage openings 13) may be provided, as is schematically indicated in FIG. 5 by the broken line at 30. (It should be pointed out that in FIG. 5, the modified shape of the shaft part has not been illustrated in the mould itself.)

As results from the sectional representations according to FIGS. 1 to 4 and 6 to 9, the nipple body 1 illustrated has a non-circular cross-section, i.e. it has an oval cross-section with a longer transverse axis, as is apparent from FIG. 1 (and FIG. 6, respectively), and a shorter transverse axis, as can be seen from FIG. 2 (and FIG. 7, respectively). Today, such a nipple shape of elliptical cross-section is preferred in most instances, however, it goes without saying that the configuration according to the invention can also be employed in different pacifiers, e.g. such having a circular cross-section.

The material thickness in the region of the hood 7, the neck portion 3 and the front-end wall 5 may, e.g., be around 1 mm, and the shaft part 8 may, e.g., be cylindrical, having a diameter of approximately 2 mm.

What is claimed is:

1. A pacifier nipple with a subdivided, elastomeric nipple body comprising:
   a fastening portion;
   a neck portion; and
   a head portion including a substance-receiving space covered by a wall;
   wherein the wall is formed by an outwardly reversible hood connected with the neck portion and forming the head portion having a rim which forms a sealing lip abutting on a front end side of the neck portion at an edge thereof and liftable therefrom.

2. A nipple according to claim 1, wherein the hood is integrally connected with the neck portion.

3. A nipple according to claim 1, wherein the hood is connected by an axial, central shaft part with a front-end wall, said front-end wall closing the neck portion.

4. A nipple according to claim 3, wherein the shaft part has at least one opening for clamping retention of medicaments in the form of tablets or capsules.

5. A nipple according to claim 1, wherein at least one channel-shaped passage is provided on the rim of the hood adjacent the neck portion.

6. A nipple according to claim 1, wherein at least one passage opening is provided in the hood.

7. A nipple according to claim 1, wherein the nipple body is made of silicone caoutchouc.

8. A nipple according to claim 1, wherein a foam rubber body is located in the substance-receiving space.

9. A method of producing a nipple with a subdivided, elastomeric nipple body, said nipple body including a fastening portion, a neck portion, and a head portion having a substance-receiving space covered by a wall, said wall being formed by an outwardly reversible hood connected with the neck portion and forming the head portion having a rim which forms a sealing lip abutting on a front end side of the neck portion at an edge thereof and liftable therefrom, the method comprising the steps of:

injection molding the nipple body with the hood in an outwardly reversed position; and turning back the hood to a normal position in which the rim is located adjacent the neck portion, after the nipple has been removed from the mould.

10. The method according to claim 9, further comprising the step of forming at least one passage opening in the outwardly reversed hood by aid of at least one spike insert, during the moulding of the nipple body.

11. The method according to claim 9, further comprising the step of forming at least one opening in an axial, central shaft part, connected with a front-end wall, by aid of at least one spike insert, during the moulding of the nipple body.

12. A device for producing a nipple with a subdivided, elastomeric nipple body, said nipple body including a fastening portion, a neck portion, and a head portion having a substance-receiving space covered by a wall, said wall being formed by an outwardly reversible hood connected with the neck portion and forming the head portion having a rim which forms a sealing lip abutting on a front end side of the neck portion at an edge thereof and liftable therefrom, comprising:

a mould corresponding to the nipple body, wherein the mould has an associated core for forming the outwardly reversed hood.

13. The device according to claim 12, wherein a further core located opposite the core for the formation of the reversed hood is provided for forming the fastening and neck portions of the nipple body.

14. The device according to claim 12, wherein the mould has recesses for inserts for shaping at least one passage opening in the hood.

15. The device according to claim 12 wherein the mould has recesses for inserts for shaping at least one opening in an axial, central shaft part, connected with a front with front end wall.

\* \* \* \* \*

UNITED STATES PATENT AND TRADEMARK OFFICE
CERTIFICATE OF CORRECTION

PATENT NO. : 6,575,999 B1
DATED : June 10, 2003
INVENTOR(S) : Peter Rohrig

It is certified that error appears in the above-identified patent and that said Letters Patent is hereby corrected as shown below:

<u>Title page,</u>
Item [30], Foreign Application Priority Data, delete "(AU)" and insert -- AT --

Signed and Sealed this

Twenty-fourth Day of February, 2004

JON W. DUDAS
*Acting Director of the United States Patent and Trademark Office*